United States Patent
Meuret et al.

(10) Patent No.: US 10,082,240 B2
(45) Date of Patent: Sep. 25, 2018

(54) FOUR BAR LINKAGE IMAGING STAND ASSEMBLY SYSTEM AND METHOD

(71) Applicant: Brunson Instrument Company, Kansas City, MO (US)

(72) Inventors: Mark J. Meuret, Overland Park, KS (US); Adam J. Warden, Lee's Summit, MO (US); Isaac H. Gipson, Independence, MO (US); Aaron A. Hudlemeyer, Peculiar, MO (US); Deighton E. Brunson, Lee's Summit, MO (US)

(73) Assignee: Brunson Instrument Company, Kansas City, MO (US)

( * ) Notice: Subject to any disclaimer, the term of this patent is extended or adjusted under 35 U.S.C. 154(b) by 0 days.

(21) Appl. No.: 14/497,029

(22) Filed: Sep. 25, 2014

(65) Prior Publication Data

US 2015/0083883 A1    Mar. 26, 2015

Related U.S. Application Data

(60) Provisional application No. 61/882,528, filed on Sep. 25, 2013.

(51) Int. Cl.
*F16M 13/00* (2006.01)
*F16M 11/42* (2006.01)
*F16M 11/04* (2006.01)

(52) U.S. Cl.
CPC .......... *F16M 11/42* (2013.01); *F16M 11/046* (2013.01); *F16M 11/048* (2013.01);
(Continued)

(58) Field of Classification Search
CPC ...... F16M 11/04; F16M 11/42; F16M 11/046; F16M 11/048; F16M 200/024; F16M 2200/041; F16M 2200/063
(Continued)

(56) References Cited

U.S. PATENT DOCUMENTS

| | | | | |
|---|---|---|---|---|
| 919,777 | A | * 4/1909 | Savin et al. | ........... F16M 11/04 248/281.11 |
| 1,036,703 | A | * 8/1912 | Pieper | ................... F16M 11/04 248/281.11 |

(Continued)

FOREIGN PATENT DOCUMENTS

| | | |
|---|---|---|
| DE | 102005036928 B3 | 2/2007 |
| EP | 1152182 | 11/2001 |

(Continued)

OTHER PUBLICATIONS

Website: http://www.foba.ch/eng/programm/programm.htm (Last accessed May 31, 2016).
European Search Report (dated Feb. 20, 2015).

*Primary Examiner* — Kimberly T Wood
(74) *Attorney, Agent, or Firm* — Kutak Rock LLP; Bryan P. Stanley

(57) ABSTRACT

A four bar linkage boom arm imaging stand assembly system and related methods are provided. The stand includes a height-adjustable imaging platform. The imaging platform is configured for holding a scanning device. The stand is configured to be mobile. The stand is also configured to be stable while moving a scanning device to a desired height and position. The stand is configured such that the imaging platform remains at a consistent orientation throughout the entire range of possible heights. The stand includes a unique brake feature for maintaining the imaging platform at a desired height.

10 Claims, 10 Drawing Sheets

(52) U.S. Cl.
CPC . *F16M 2200/024* (2013.01); *F16M 2200/041* (2013.01); *F16M 2200/063* (2013.01)

(58) Field of Classification Search
USPC ...... 248/123.11, 123.2, 181.11, 280.11, 128, 248/162.1, 370, 125.2, 125.3, 585, 648, 248/127
See application file for complete search history.

(56) References Cited

U.S. PATENT DOCUMENTS

| | | | | |
|---|---|---|---|---|
| 1,040,575 A * | 10/1912 | Pieper | ................. | F16M 11/04 248/281.11 |
| 1,070,524 A * | 8/1913 | Pieper | ................. | F16M 11/04 248/281.11 |
| 1,515,442 A * | 11/1924 | Rankin | ................. | F16M 11/12 248/278.1 |
| 1,863,349 A * | 6/1932 | Noelting | ................. | A01G 3/08 16/35 R |
| 2,905,275 A * | 9/1959 | Kostolecki | ............ | B60B 33/021 16/35 R |
| 3,269,681 A * | 8/1966 | Azim | ................. | F16M 11/42 248/125.1 |
| 3,533,583 A * | 10/1970 | Azim | ................. | F16M 11/04 248/124.2 |
| 4,003,536 A * | 1/1977 | Sekerich | ............ | A61M 5/1415 248/485 |
| 4,163,538 A * | 8/1979 | Galione | ................. | B66F 11/048 248/124.1 |
| 4,213,591 A * | 7/1980 | Jaakkola | ................. | F16M 11/04 248/281.11 |
| 4,447,031 A * | 5/1984 | Souder, Jr. | ............ | F16M 11/04 248/281.11 |
| 4,568,052 A * | 2/1986 | Solomon | ................. | B41J 29/15 248/281.11 |
| 4,844,387 A * | 7/1989 | Sorgi | ................. | F16M 11/04 108/5 |
| 4,953,822 A * | 9/1990 | Sharber | ................. | F16M 11/04 248/280.11 |
| 4,987,690 A * | 1/1991 | Aaldenberg | ............ | B41J 29/15 248/281.11 |
| 5,023,755 A * | 6/1991 | Rosenberg | ................. | F16M 11/04 248/124.1 |
| 5,150,866 A * | 9/1992 | Karpisek | ................. | B67D 7/002 248/281.11 |
| 5,170,975 A * | 12/1992 | Chadwick | ............ | F16M 11/04 248/284.1 |
| 5,746,404 A * | 5/1998 | Merko | ................. | F16M 11/04 248/123.11 |
| 5,842,672 A * | 12/1998 | Sweere | ................. | A47B 21/00 248/278.1 |
| 6,070,839 A * | 6/2000 | Brenner | ................. | F16M 11/04 248/123.11 |
| 6,138,964 A * | 10/2000 | Rose | ................. | F16M 11/04 248/123.11 |
| 6,550,734 B1 * | 4/2003 | Spadea | ................. | F16M 11/04 248/274.1 |
| 7,104,512 B2 * | 9/2006 | Wolf | ................. | F16M 11/04 248/276.1 |
| 7,562,851 B2 * | 7/2009 | Hein | ................. | F16M 11/04 248/276.1 |
| 8,327,555 B2 | 12/2012 | Champ | | |
| 8,402,669 B2 | 3/2013 | Ferrari | | |
| 8,407,907 B2 | 4/2013 | Tait | | |
| 8,662,324 B2 * | 3/2014 | Robinson | ............... | A47G 23/02 211/126.4 |
| 2002/0014562 A1 * | 2/2002 | Twisselmann | ......... | F16M 11/04 248/123.11 |
| 2002/0064048 A1 * | 5/2002 | Sander | ................. | F16M 11/08 362/401 |
| 2002/0190180 A1 * | 12/2002 | Cotterill | ............. | A47B 21/0314 248/370 |
| 2003/0132065 A1 * | 7/2003 | Suzuki | ............... | B60B 33/0007 188/1.12 |
| 2004/0020008 A1 * | 2/2004 | Harris | ................. | B60B 33/0007 16/35 R |
| 2004/0245419 A1 * | 12/2004 | Sweere | ................. | F16M 11/04 248/276.1 |
| 2006/0102819 A1 * | 5/2006 | Li | ................. | F16M 11/04 248/280.11 |
| 2006/0266898 A1 * | 11/2006 | Lin | ................. | F16M 13/02 248/220.21 |
| 2007/0001076 A1 * | 1/2007 | Asamarai | ............... | F16M 11/04 248/281.11 |
| 2007/0040084 A1 * | 2/2007 | Sturman | ................. | F16M 11/04 248/280.11 |
| 2007/0108355 A1 * | 5/2007 | Li | ................. | F16M 11/04 248/280.11 |
| 2007/0228230 A1 * | 10/2007 | Papendieck | ............ | F16M 11/04 248/126 |
| 2007/0295878 A1 * | 12/2007 | Smed | ................. | F16M 11/04 248/413 |
| 2010/0127144 A1 | 5/2010 | Lange | | |
| 2011/0147546 A1 | 6/2011 | Monsalve et al. | | |
| 2013/0097804 A1 * | 4/2013 | Weichbrodt | ........ | B60B 33/0042 16/47 |
| 2013/0129406 A1 | 5/2013 | Duportal et al. | | |
| 2013/0140424 A1 * | 6/2013 | Frick | ................. | F16M 11/00 248/550 |
| 2015/0053829 A1 * | 2/2015 | Lu | ................. | F16M 13/022 248/123.11 |

FOREIGN PATENT DOCUMENTS

FR         2640206         6/1990
GB         1088226         10/1967

* cited by examiner

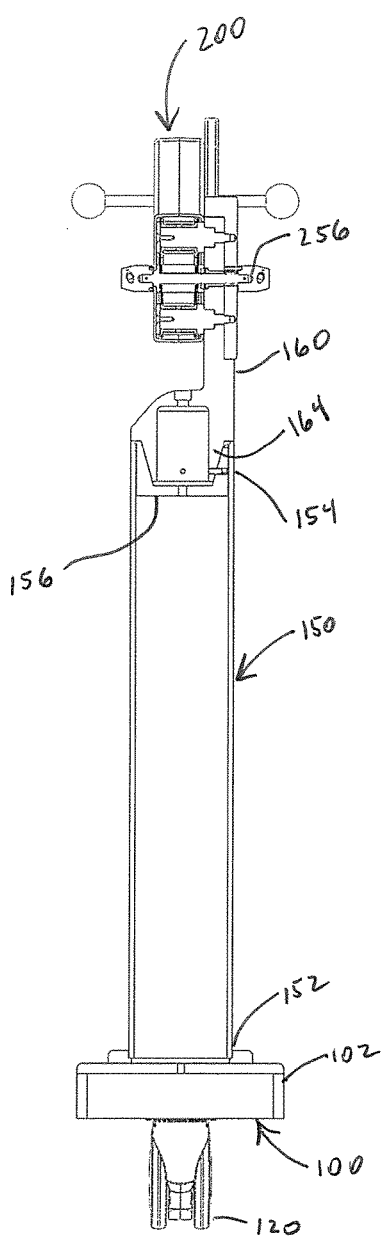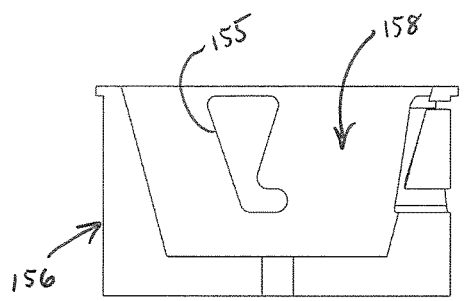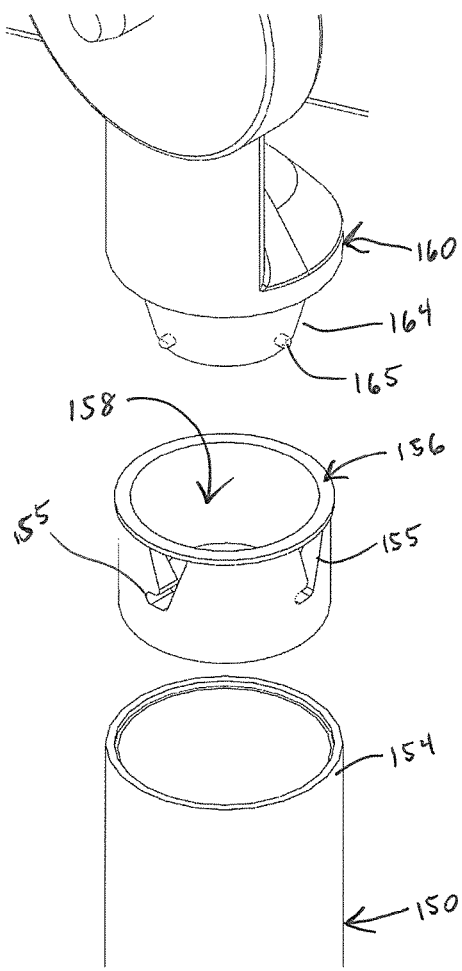
Fig. 8A
Fig. 8B
Fig. 8C

FOUR BAR LINKAGE IMAGING STAND ASSEMBLY SYSTEM AND METHOD

CROSS-REFERENCE TO RELATED APPLICATIONS

This application claims priority pursuant to 35 U.S.C. 119(e) to U.S. Provisional Patent Application Ser. No. 61/882,528, filed Sep. 25, 2013, the entire disclosure of which is incorporated herein by reference.

FIELD

The present general inventive concept relates to an imaging stand system and method to be used in metrology. Specifically, the imaging stand provides a height-adjustable imaging platform for holding a scanning or imaging device. The imaging stand and boom arm are configured such that the imaging platform remains level with respect to horizontal (i.e. a consistent orientation) throughout the entire range of adjustable height. The imaging platform is configured such that a scanning or imaging instrument can be mounted thereon.

BACKGROUND

A large number of industries require precise and accurate measuring for a number of applications such as production, manufacturing, and process control. In many such applications, measurement errors on the order of even one ten-thousandth of an inch can be critical. Instruments such as laser trackers, scanners, imaging devices, associated targets and the like are particularly well suited for such applications because they provide extreme precision and accuracy.

Often, stands are used to hold instruments in position during use. Most stands of the prior art are stationary. Other stands provide limited adjustability. This lack of portability and adjustability makes positioning instruments difficult and time consuming.

SUMMARY

The present general inventive concept provides an imaging stand that includes a height-adjustable imaging platform. The imaging platform is configured for holding an imaging device, such as a scanner or the like. in at least a first angular orientation relative to the horizontal support plane. In some embodiments, the imaging platform is capable of holding the imaging device in a variety of orientations. The stand is configured such that the orientation of the imaging platform remains consistent throughout the entire range of possible heights. For instance, when the imaging platform is oriented to be level and horizontal at one height, the imaging platform remains level and horizontal through the entire range of possible heights. In some embodiments, the stand includes a unique brake feature for maintaining the imaging platform at a particular height.

One object of the present inventive concept is to provide an imaging stand assembly system, as described herein. Another object of the present inventive concept is to provide a method of using an imaging stand assembly system, as described herein. Another object of the present inventive concept is to provide a method of manufacturing an imaging stand assembly system, as described herein.

Additional aspects and utilities of the present general inventive concept will be set forth in part in the description which follows and, in part, will be obvious from the description, or may be learned by practice of the general inventive concept.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings. For the purpose of illustration, forms of the present general inventive concept which are presently preferred are shown in the drawings; it being understood, however, that the general inventive concept is not limited to the precise arrangements and instrumentalities shown. In the drawings:

FIG. 8A is a cross-sectional view of FIG. 7A taken along line 8A-8A.

FIG. 8B is a cross-sectional view of a tapered bushing.

FIG. 8C is an exploded perspective view of a portion of an exemplary embodiment of an imaging stand assembly system, as in FIG. 6A, showing a top end of a vertical support member.

DETAILED DESCRIPTION

Figure 1:
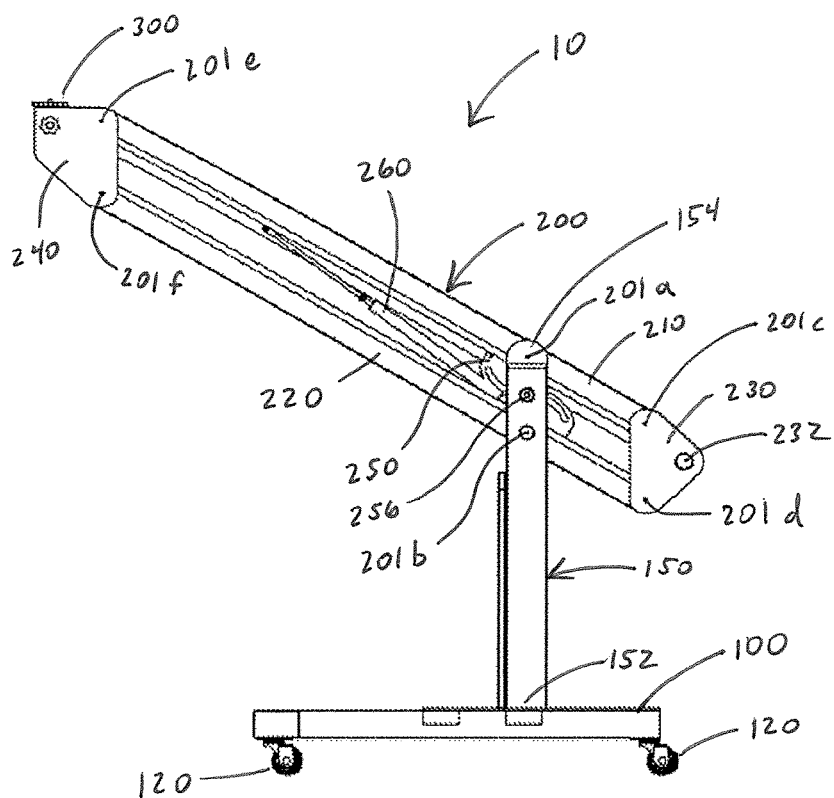
FIG. 1 is a side view of an exemplary embodiment of an imaging stand assembly system with an imaging platform in a raised position.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIG. 1, a side view of an exemplary embodiment of a four bar linkage imaging stand assembly system 10 is shown. The imaging stand 10 shown in FIG. 1 includes a base member 100 with wheels 120. The base member 100 includes a profile generally configured to provide good foot clearance (e.g. over cords and other obstacles) and a low profile to allow the base to be positioned under equipment and other fixtures. A bottom end 152 of a vertical support member 150 is fixed to the base member 100 and extends vertically upward.

As shown in FIG. 1, a boom arm 200 is connected to a top end 154 of the vertical support member 150 via two pivot connections 201. The boom arm 200 includes an aft portion 202 and a forward portion 204. The boom arm 200 also includes an upper boom arm 210 and a lower boom arm 220. The upper boom arm 210 connects to the vertical support 150 via pivot connection 201a. The lower boom arm 220 connects to the vertical support 150 via pivot connection 201b. In some embodiments, the upper boom arm 210 and lower boom arm 220 are configured to remain parallel with each other while pivoting on their respective pivot connections 201a and 201b.

In the embodiment shown in FIG. 1, the forward portion 204 of the boom arm 200 extends a greater distance away from the vertical support 150 than does the aft portion 202 of the boom arm 200. In other words, when measured from the vertical support 150, the forward portion 204 of the boom arm 200 is longer and the aft portion 202 is shorter.

In some embodiments, an aft end linkage component 230 is coupled to the aft portion 202 of the boom arm 200. In some such embodiments, the upper boom arm 210 is connected to the aft end linkage component 230 via pivot connection 201c. In other such embodiments, the lower boom arm 220 is connected to the aft end linkage component 230 via pivot connection 201d. In still other such embodiments, the upper boom arm 210 and lower boom arm 220 are configured to remain parallel with each other while pivoting on their respective pivot connections 201c and 201d.

In other embodiments, a forward end linkage component 240 is coupled to the forward portion 204 of the boom arm 200. In some such embodiments, the upper boom arm 210 is connected to the forward end linkage component 240 via pivot connection 201e. In other such embodiments, the lower boom arm 220 is connected to the forward end linkage component 240 via pivot connection 201f. In still other such embodiments, the upper boom arm 210 and lower boom arm 220 are configured to remain parallel with each other while pivoting on their respective pivot connections 201e and 201f.

Figure 2:
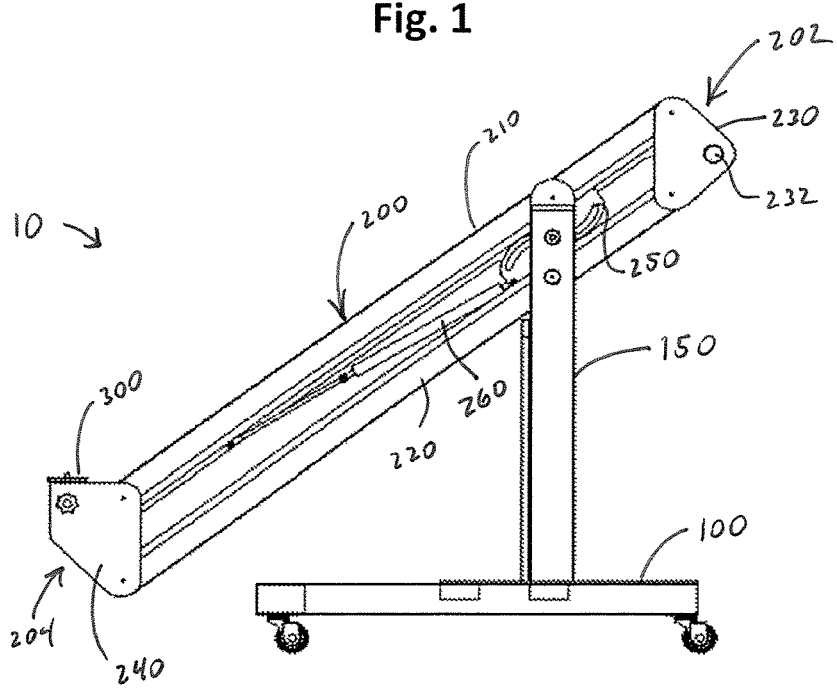
FIG. 2 is a side view of an exemplary embodiment of the imaging stand assembly system, as in FIG. 1, with the imaging platform in a lowered position.

In some embodiments, an imaging platform 300 is coupled to the forward end linkage component 240 of the boom arm 200. Through movement of the boom arm 200, the imaging platform 300 is movable between a raised configuration (FIG. 1) and a lowered configuration (FIG. 2).

According to the embodiment shown in FIG. 1, the aft end linkage component 230 includes an aft handle 232 for easy maneuverability of the imaging stand 10 and/or to assist in adjusting the height of the imaging platform 300. In other embodiments, the forward end linkage component 240 includes a forward handle 242 to assist in moving the imaging stand 10 and/or assist in adjusting the height of the imaging platform. In still other embodiments, the aft handle 232 and/or the forward handle 242 are coupled to their respective aft 202 and forward 204 portions of the boom arm 200 but displaced from their respective aft 230 and/or forward 240 end linkage components.

Although not shown in the figures, one skilled in the art will appreciate that it is not necessary for one side of the boom arm 200 to be longer than the other. In some embodiments, not shown, the boom arm 200 extends equal distance on both sides of the vertical support 150. In other embodiments, not shown, the short end is completely eliminated and the vertical support 150 with its pivot connections 201 operate as an aft end linkage component 230.

Sitting atop the forward end linkage component 240 is an imaging platform 300. The imaging platform 300 is configured such that a scanner or other metrology instrument may be mounted thereon. In some embodiments, the boom arm 200 is capable of positioning the imaging platform 300 at a predetermined height relative to the base member 100.

The height of the imaging platform 300 is adjustable. The boom arm 200 is configured so that a user can adjust the height of the imaging platform 300, while maintaining the orientation of the imaging platform 300. For instance, in some embodiments, the boom arm 200 is configured so that a user can adjust the height of the imaging platform 300, while keeping the imaging platform 300 in a first angular orientation relative to the horizontal support plane. In some embodiments, the first angular orientation is horizontal and level.

In some embodiments, the upper boom arm 210 includes three pivot connections 201a, 201c, 201e and the lower boom arm 220 includes three pivot connections 201b, 201d, 201f. In some such embodiments, the imaging platform 300 is configured to remain horizontal and level (e.g. level with respect to the base) regardless of the adjusted height of the imaging platform 300. A user rotates the boom arm 200 to adjust the height of the imaging platform 300. According to FIG. 1, the height of the imaging platform 300 is shown in a raised position.

Thus, according to FIG. 1, the imaging platform 300 is positioned at a location of adjustable height above the base member 100. The imaging platform 300 is also positioned at a location horizontally outward and away a predetermined distance from the base member 100.

In some embodiments, an adapter is used to mount the scanner or other metrology instrument on the platform 300 in a preferred position. For example, if the stand 10 is intended to be used to boom over top and look down at an object to be measured, an adapter in some embodiments is used to accordingly mount a scanner to the platform 300. By way of another example, if the stand 10 is intended to be used to scan horizontally an object that is larger than the scanning field of the scanner, the scanner in some embodiments is mounted to the platform 300 such that horizontal scans may be taken and that orientation is preserved as the boom is raised and lowered as the larger area is scanned. The platform mount allows fine directional movement of the scanner or other metrology instrument at the location of the scanner or instrument, while maintaining a consistent orientation with respect to the stand 10 throughout the range of height adjustment.

In other embodiments, an end pivot 302 coupled to the boom arm 200 and the imaging platform 300 allows for rotating a scanner, or any other object coupled to the imaging platform 300, up to 360 degrees relative to a reference axis. In some such embodiments, the reference axis is a horizontal axis running in a fore-aft direction relative to the base member 100. In other such embodiments, the reference axis is oriented other than horizontally and/or runs in a direction other than in a fore-aft direction relative to the base member 100.

Although the figures show only one platform 300 connected to the forward end linkage component 240, one skilled in the art will appreciate that in some embodiments an imaging platform 300 will be connected to the end linkage component on the aft end linkage component 230, additionally or instead.

According to FIG. 1, the boom arm 200 includes a spring mechanism 260. The spring mechanism 260 connects between the upper boom arm 210 and lower boom arm 220. The spring mechanism 260 is configured to counteract gravitational forces to make it easier for a user to adjust the height of the imaging platform 300. One skilled in the art will appreciate that other features, not discussed herein, will be apparent to those of ordinary skill in the art to employ in various embodiments of the invention to counteract gravitational forces to make it easier for a user to adjust the height of the imaging platform.

As shown in FIG. 1, the imaging stand 10 also includes a unique braking mechanism 250 that is movable between a locked configuration and an unlocked configuration. In the locked configuration, the braking mechanism 250 retains the boom arm 200 in place such that the imaging platform 300 is secured and/or locked at a desired height. In the unlocked configuration, the braking mechanism 250 releases the boom arm 200 so that the height of the imaging platform 300 is capable of being adjusted.

Figure 5A:
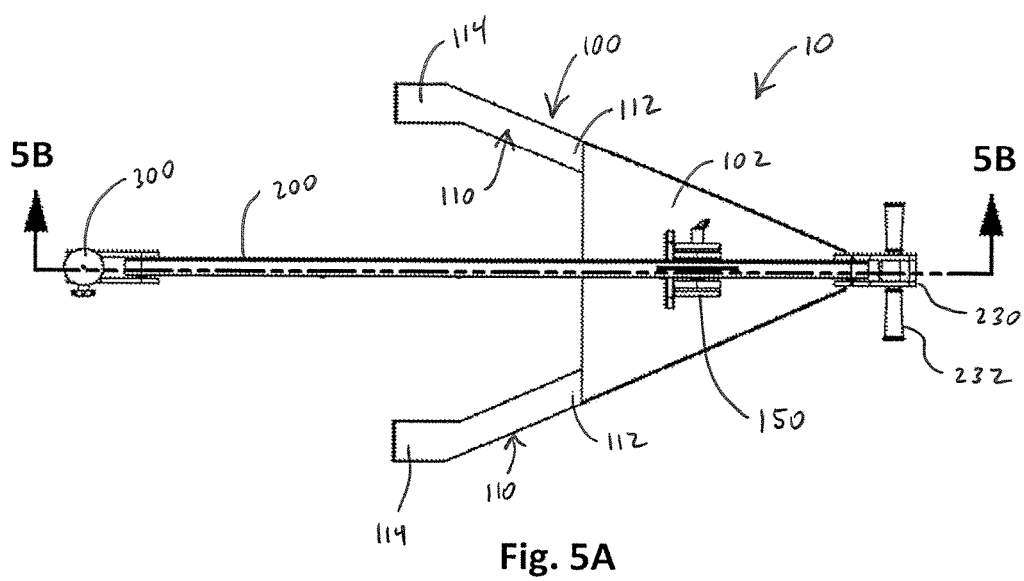
FIG. 5A is a top view of an exemplary embodiment of the imaging stand assembly system, as in FIG. 1, with the imaging platform in an intermediate vertical position.
Figure 5B:
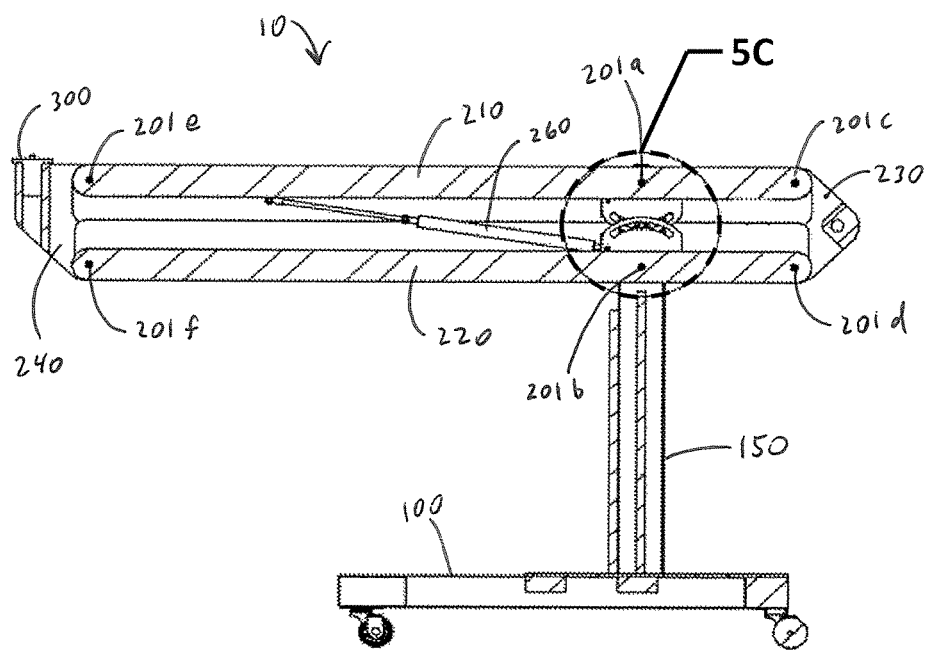
FIG. 5B is a cross-sectional view of FIG. 5A taken along line 5B-5B.
Figure 5C:
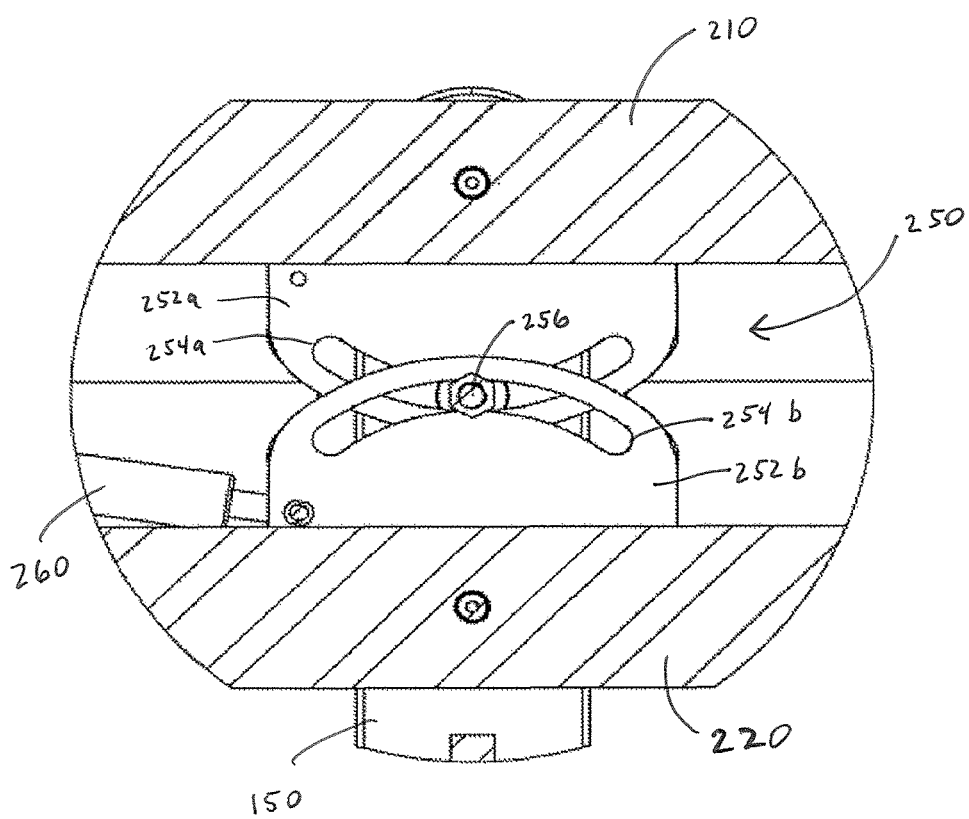
FIG. 5C is a detail view of a portion of FIG. 5B enclosed within circle 5C.

As shown in FIG. 1 and FIG. 5C, some embodiments of the braking mechanism 250 includes two brake plates 252 and a locking pin 256 operatively coupled to each brake plate 252. The locking pin 256 is movable between a loosened configuration and a tightened configuration. In the loosened configuration, the locking pin 256 and the brake plates 252 are configured so that the brake plates 252 are capable of sliding past each other. In the tightened configuration, the locking pin 256 presses the two brake plates 252 together so as to prevent the brake plates 252 from sliding past each other.

When a user desires to adjust the height of the imaging platform 300, the locking pin 256 is loosened. With the locking pin 256 loosened, the boom arm 200 is capable of being rotated, thus adjusting the height of the imaging platform 300. When the imaging platform 300 is positioned at a desired height, the locking pin 256 is tightened, pressing the two brake plates 252 together and locking the boom arm 200 in place.

In some embodiments, the locking pin 256 is moved between the loosened configuration and the tightened configuration by rotating the locking pin 256. In some such embodiments, the locking pin 256 need only be rotated a partial revolution, for instance a quarter of a revolution, to move between the loosened configuration and the tightened configuration. In other such embodiments, the locking pin 256 includes a locking lever 258 extending from one end of the locking pin 256 so as to provide a user with a mechanical advantage for moving the locking pin 256 between the tightened and loosened configurations. I In some embodiments, the locking pin 256 extends through the boom arm 200 and includes a locking lever 258 extending from each end of the locking pin 256 so as to provide a user with a mechanical advantage to move the locking pin 256 between the tightened and loosened configurations from either side of the boom arm 200. In some such embodiments, the locking pin 256 is configured such that the locking lever 258 on either side of the boom arm 200 moves in unison with the locking lever 258 on the other side of the boom arm 200. For instance, in some embodiments requiring only a quarter of a turn for the locking pin 256 to move between the tightened and loosened configurations, the locking levers 258 both extend radially forward when the locking pin 256 is in the tightened configuration and both extend radially downwards when the locking pin 256 is in the loosened configuration. In this way, the orientation of the locking levers 258 communicates to a user whether the locking pin 256 is in the tightened configuration, the loosened configuration, or somewhere in-between the tightened and loosened configurations. In so doing, in some embodiments, the orientation of the locking levers 258 also communicates to a user whether the braking mechanism 250 is in the locked configuration, the unlocked configuration, or somewhere in-between the locked and unlocked configurations.

As illustrated in FIG. 2, a side view of an exemplary embodiment of an imaging stand assembly system 10 is shown. The embodiment shown in FIG. 2 is substantially identical to the embodiment shown in FIG. 1. FIG. 2 shows the same side as shown in FIG. 1. Unlike FIG. 1, FIG. 2 shows the imaging platform 300 in a lowered position.

Figure 3:
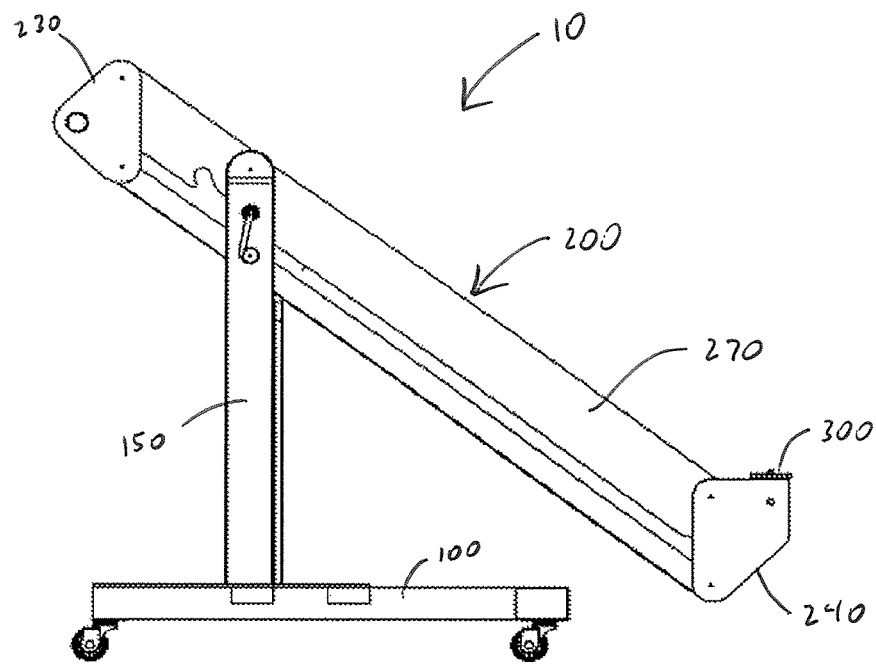
FIG. 3 is a side view of an exemplary embodiment of the imaging stand assembly system, as in FIG. 2, showing the opposite side view of FIG. 2.

As illustrated in FIG. 3, another view of an exemplary embodiment of an imaging stand assembly system 10 is shown. FIG. 3 shows a side view opposite of the view shown in FIG. 2.

Figure 4:
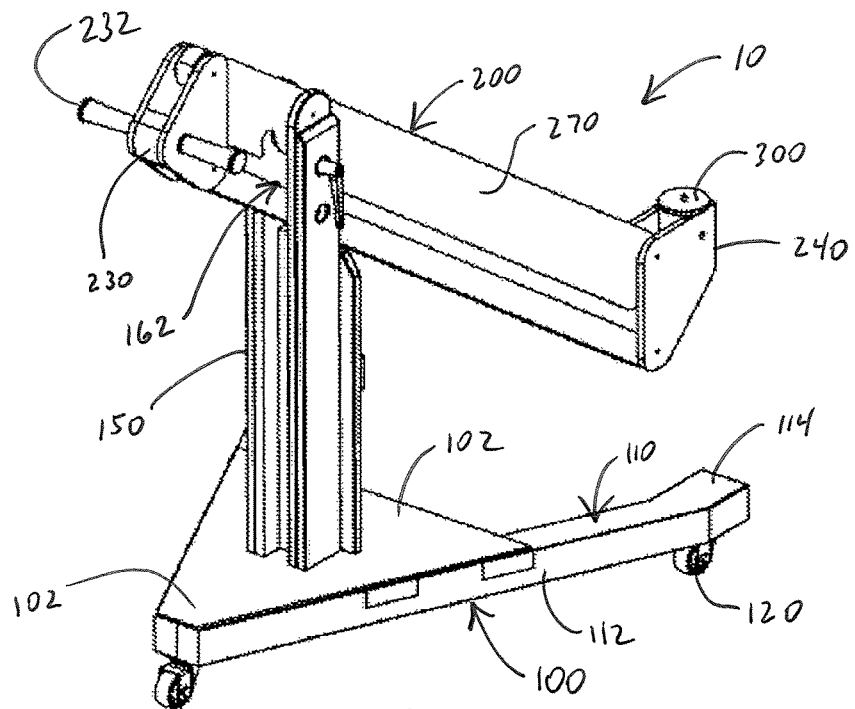
FIG. 4 is a perspective view of an exemplary embodiment of the imaging stand assembly system as in FIG. 2.

As illustrated in FIG. 4, a perspective view of an exemplary embodiment of an imaging stand assembly system 10 is shown. Like FIGS. 2 and 3, FIG. 4 shows the imaging platform 300 in a lowered position.

FIGS. 3 and 4 show a boom arm cover 270 attached to the boom arm 200. In some embodiments, the boom arm cover 270 protects the user from inadvertently getting fingers, clothing, or other foreign objects caught between the upper boom arm 210 and lower boom arm 220. In other embodiments, the boom arm cover 270 also covers and protects the spring mechanism 260. Although the boom arm cover 270 is shown on one side only (in FIGS. 3 and 4), one skilled in the art will appreciate that in some embodiments, the boom arm cover 270 is configured to cover both sides of the boom arm 200, while retaining the freedom of movement of the various components of the boom arm 200.

The boom arm cover 270 is for both aesthetics and safety. In some embodiments, the boom arm cover 270 includes a top portion affixed to the upper boom arm 210 and a lower portion affixed to the lower boom arm 220. In some such embodiments, the top portion and lower portion are offset slightly from one another such that they slide together and overlap one another as the distance between the upper boom arm 210 and lower boom arm 220 changes as the height is adjusted. In other embodiments, the boom arm cover 270 includes at least one side portion.

As illustrated in FIG. 5A, a top view of an exemplary embodiment of an imaging stand assembly system 10 is shown.

As illustrated in FIG. 5B, a cross-sectional view of FIG. 5A along line 5B-5B is shown. The unique braking mechanism 250 is highlighted at 5C.

As illustrated in FIG. 5C, a detail view of a portion of FIG. 5B enclosed within circle 5C is shown. As discussed above, FIG. 5C shows details of one embodiment of the braking mechanism 250. In the embodiment shown in FIG. 5C, the braking mechanism 250 includes two brake plates 252. An upper brake plate 252a is affixed to the upper boom arm 210 and extends towards the lower boom arm 220. A lower brake plate 252b is affixed to the lower boom arm 220 and extends towards the upper boom arm 210.

Figure 9A:
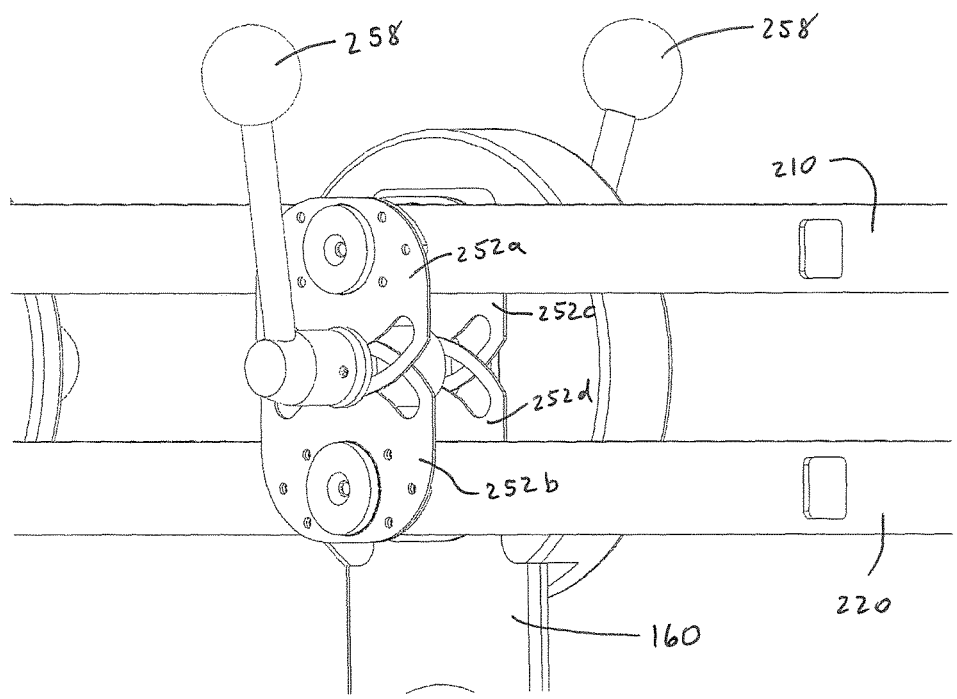
FIG. 9A is a perspective detail view of a portion of a braking mechanism.

In other embodiments, such as those represented by FIG. 9A, the braking mechanism 250 includes four brake plates 252. Upper brake plates 252a and 252c are affixed to the upper boom arm 210 and extend towards the lower boom arm 220. Lower brake plates 252b and 252d are affixed to the lower boom arm 220 and extend towards the upper boom arm 210.

In some embodiments, each brake plate 252 defines one or more slot 254. For instance, in the embodiment shown in FIG. 5C, the upper brake plate 252a defines an upper arc-shaped slot 254a and the lower brake plate 252b defines a lower arc-shaped slot 254b. In some such embodiments, the arc-shaped slots 254 are configured so that they both receive the locking pin 256 when the imaging platform 300 is in the raised position, when the imaging platform 300 is in the lowered position, and throughout the imaging platform's travel between the raised and lowered positions. In other words, the locking pin 256 extends through both arc-shaped slots 254a and 254b, linking the brake plates 252a and 252b to each other, regardless of the imaging platform's position. In some such embodiments, the arc-shaped slots 254 define the raised and lowered positions of the imaging platform 300 by not allowing the imaging platform 300 to be raised or lowered beyond a point at which the locking pin 256 bears against an end of one or more slot 254.

In some embodiments, the locking pin 256 is capable of being loosened and/or tightened. When the locking pin 256 is tightened, the brake plates 252 are pressed toward each other, thus locking the upper boom arm 210 and lower boom arm 220 in their respective positions. In this way, the locking pin 256 causes the imaging platform 300 to be locked at a particular location. When the locking pin 256 is loosened, the brake plates 252 are released so that they are free to slide past one another as the upper boom arm 210 and the lower boom arm 220 are moved relative to one another.

In still other embodiments, the braking mechanism 250 includes a stop pin 257. The stop pin 257 prevents the locking pin 256 from rotating beyond a certain point. In some such embodiments, the stop pin 257 prevents the locking pin 256 from becoming over-tightened so as to prevent the locking pin 256 from causing the braking mechanism 250 to bind up. In other such embodiments, the stop pin 257 prevents the locking pin 256 from becoming too loose so as to prevent the locking pin 256 from coming apart and/or coming free from the imaging stand 10.

Figure 9B:
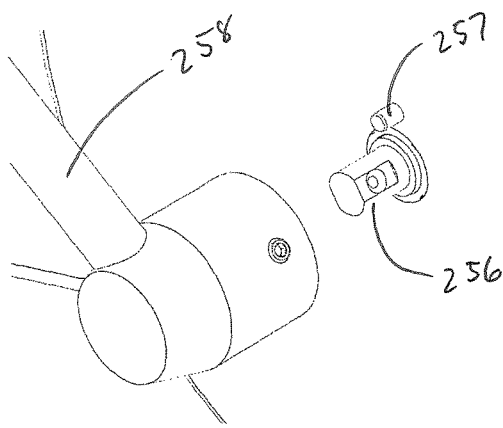
FIG. 9B is an exploded perspective view of a portion of an exemplary embodiment of an imaging stand assembly system, as in FIG. 6A, showing a locking lever.
Figure 9C:
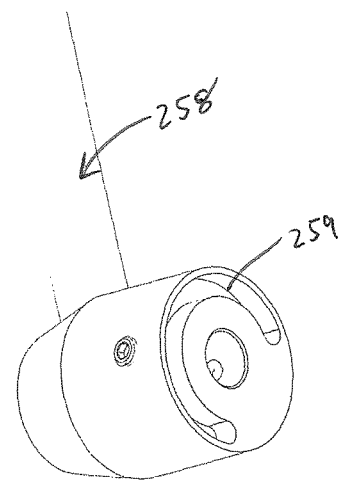
FIG. 9C is a perspective view of a portion of a locking lever.
Figure 10A:
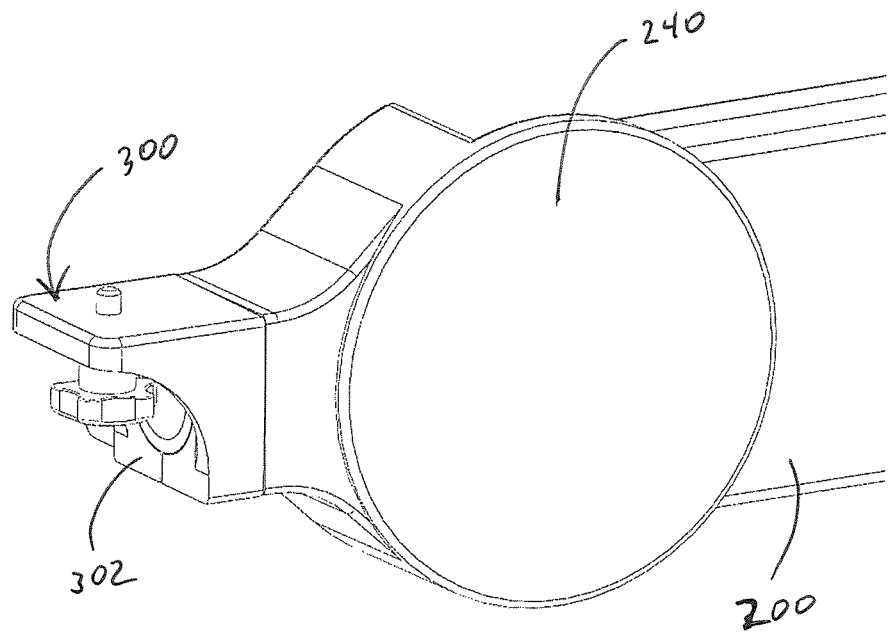
FIG. 10A is a perspective detail view of an imaging platform.
Figure 10B:
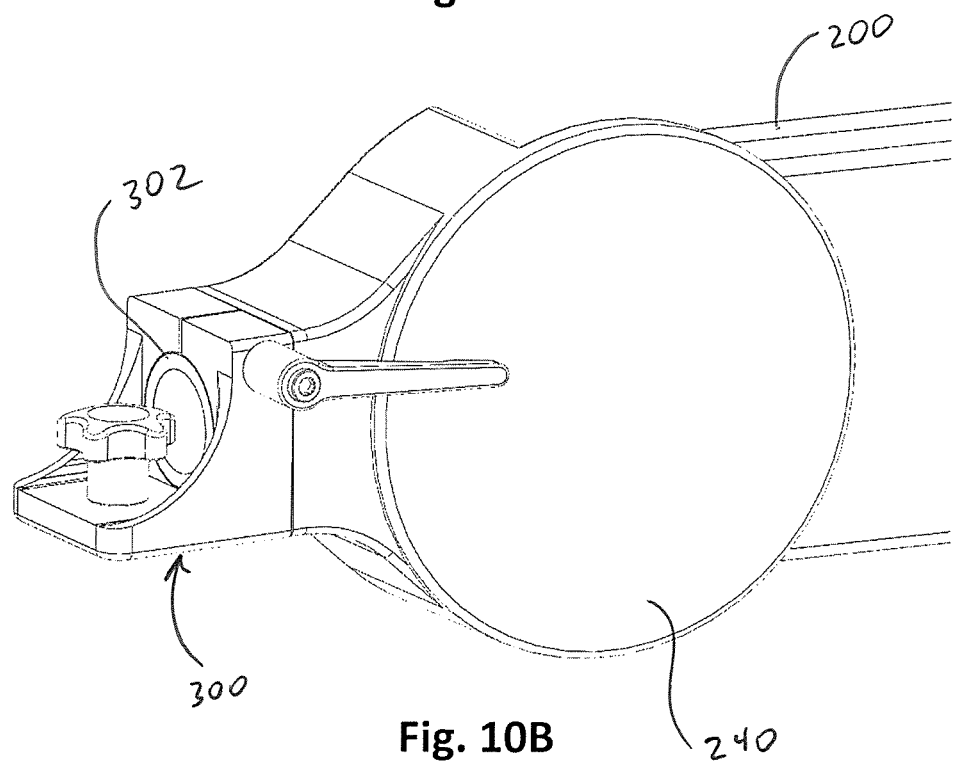
FIG. 10B is a perspective detail view of an imaging platform, as in FIG. 10A, taken from a different angle as FIG. 10A.

In some embodiments, the stop pin 257 is configured to be received by a stop pin raceway 259. In some such embodiments, such as in the embodiment shown in FIGS. 9B and 9C, the stop pin raceway 259 is defined by a locking lever 258. In such an embodiment, the locking lever is free to rotate until the stop pin 257 contacts an end of the stop pin raceway 259. In this way, the stop pin 257 and the stop pin raceway 259 define the maximum rotational movement of the locking lever 258, thereby defining the maximum tightening and loosening of the locking pin 256.

Some embodiments of the present invention include a base member 100 that is configured to be supported by a generally horizontal support plane, such as a concrete floor. In some such embodiments, the base member 100 includes a plurality of wheels 120 so as to enable moving the imaging stand 10 along the horizontal support plane while the imaging platform 300 is being secured in a vertical position. In some embodiments, at least one of the wheels 120 is a caster wheel. In other embodiments, all of the wheels 120 are caster wheels.

In some embodiments, the base member 100 includes at least one lockable wheel 120. In other embodiments, plural wheels are lockable. In some such embodiments, all wheels are lockable. The lockable wheel(s) 120 is movable between a locked configuration and an unlocked configuration. In the locked configuration, the at least one lockable wheel 120 prevents or hinders the imaging stand 10 from moving along the horizontal support plane. In the unlocked configuration, the at least one lockable wheel 120 is configured to rotate freely as the imaging stand 10 is moved along the horizontal support plane.

In some embodiments, the at least one lockable wheel 120 includes a wheel lock lever 122. The wheel lock lever 122 is operatively coupled to the lockable wheel 120 and is movable between a first position and a second position. In some such embodiments, movement of the wheel lock lever 122 from the first position to the second position moves the lockable wheel 120 from the unlocked configuration to the locked configuration. Conversely, movement of the wheel lock lever 122 from the second position to the first position moves the lockable wheel 120 from the locked configuration to the unlocked configuration.

In some embodiments, the lockable wheel 120 includes an actuator rod 128 operably connected to the wheel lock lever 122. In some such embodiments, movement of the wheel lock lever 122 between the first and second positions causes the actuator rod 128 to rotate so as to move the lockable wheel 120 between respective locked and unlocked configurations. To accomplish this, the wheel lock lever 122 includes at least one attachment point (not shown) for coupling the wheel lock lever 122 to the actuator rod 128.

In some embodiments, the attachment point(s) is located between a first portion 124 and a second portion 126 of the wheel lock lever 122 so that the first 124 and second 126 portions of the wheel lock lever 122 are capable of rotating about an axis going through the attachment point(s). In this way, movement of the first 124 and second 126 portions of the wheel lock lever 122 causes the actuator rod 128 to rotate. In some such embodiments, the first portion 124 of the wheel lock lever 122 is adjacent to a portion of a support arm 110 of the base member 100 when the wheel lock lever is in the first position. In other such embodiments, the distal end 114 of the support arm 110 includes a lever stop 115 and the second portion 126 of the wheel lock lever 122 is adjacent to the lever stop 115 when the wheel lock lever 122 is in the second position. In this way, the support arm 110 and the lever stop 115 prevent the wheel lock lever from rotating beyond respective first and second positions.

In some embodiments, the wheel lock lever 122 is visible from virtually any angle relative to the imaging stand 10 so as to provide a visual indication of the configuration of a respective wheel 120. In this way, a wheel lock lever 122 in a first position communicates to a user that the lockable wheel 120 is in the unlocked configuration. Conversely, a wheel lock lever 122 in a second position communicates to a user that the lockable wheel 120 is in the locked configuration. Consequently, by being visible from virtually any angle relative to the imaging stand 10, a user can simply view the position of each wheel lock lever 122 to determine whether an imaging stand 10 can be moved along the horizontal support plane or whether one or more lockable wheel 120 in the locked configuration will prevent such movement.

In some embodiments, the wheel lock lever 122 is configured to move from the first configuration to the second configuration when a downward force is applied to a first portion 124 of the wheel lock lever 122. In this way, the wheel lock lever 122 is capable of being moved from the first configuration to the second configuration simply by stepping on the first portion 124 of the wheel lock lever 122. In other embodiments, the wheel lock lever 122 is configured to move from the second configuration to the first configuration when a downward force is applied to a second portion 126 of the wheel lock lever 122. In this way, the wheel lock lever 122 is capable of being moved from the second configuration to the first configuration simply by stepping on the second portion 126 of the wheel lock lever 122.

In some embodiments of the present invention, the base member 100 includes a hub member 102. In the embodiment shown in FIG. 1 and FIG. 5A, the hub member 102 is triangular in shape. In the embodiment shown in FIG. 6A, the hub member 102 is circular in shape. One skilled in the art will appreciate that other configurations and/or shapes will be apparent to those of ordinary skill in the art to employ in various embodiments of the invention.

In some embodiments, the base member 100 includes a plurality of support arms 110 extending from the hub member 102. Each support arm 110 includes a proximal end 112 coupled to the hub member 102 and a distal end 114 displaced from the hub member 102. In some embodiments, a wheel 120 is coupled to each support arm 110 at or near the distal end 114 of the support arm 110. In some such embodiments, a plurality of wheels 120 provides at least three distinct points of contact between the base member 100 and a horizontal support plane.

Figures 6A, 6B:
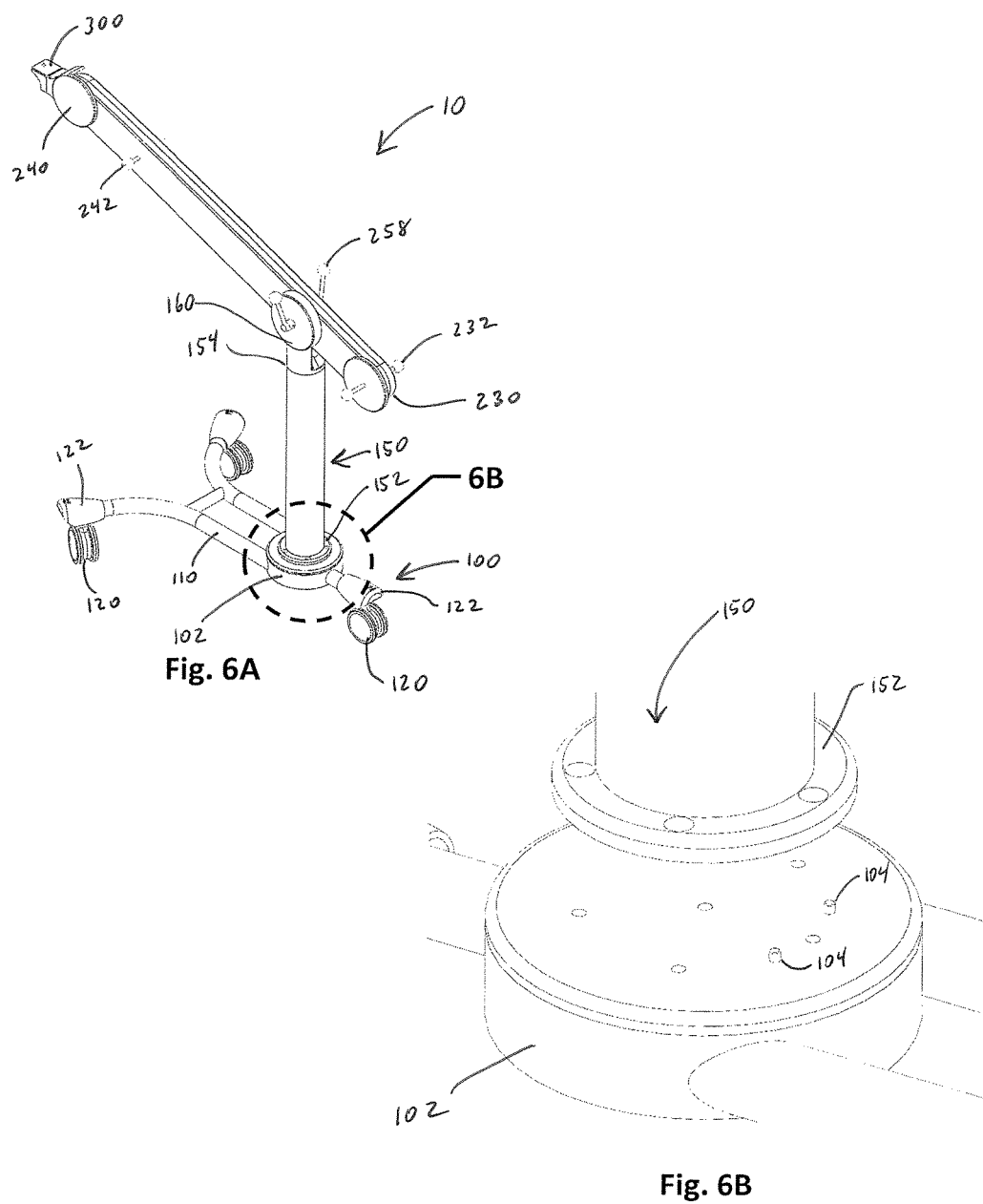
FIG. 6A is a perspective view of an exemplary embodiment of the imaging stand assembly system.
FIG. 6B is a detail view of a portion of FIG. 6A enclosed within circle 6B.
Figure 7A:
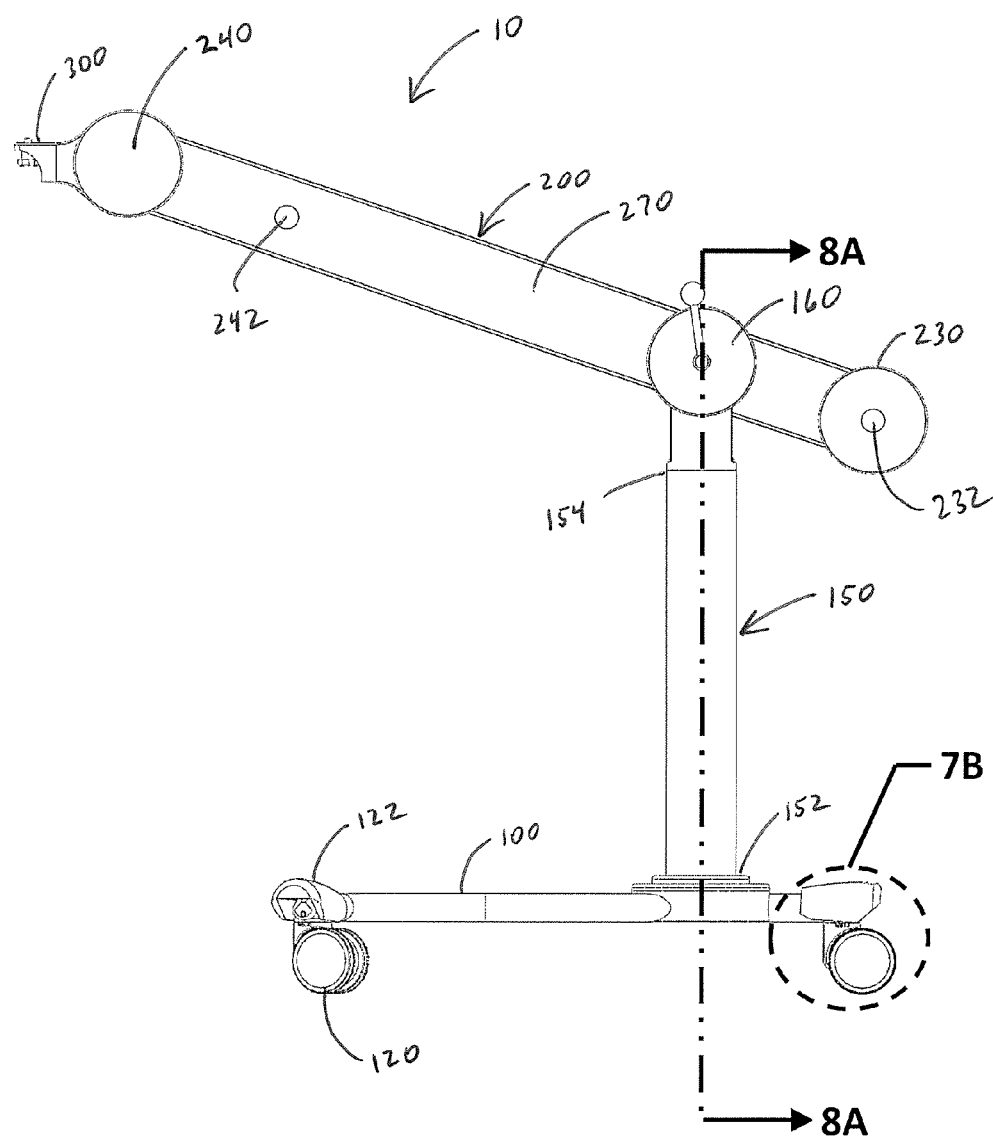
FIG. 7A is a side view of another exemplary embodiment of an imaging stand assembly system with the imaging platform in a raised position.
Figure 7B:
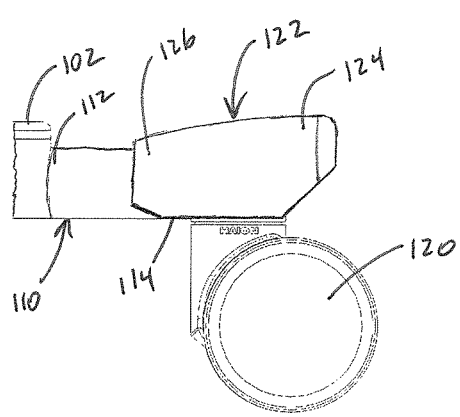
FIG. 7B is a detail view of a portion of FIG. 7A, enclosed within circle 7B, showing a wheel lock lever in a first position.
Figure 7C:
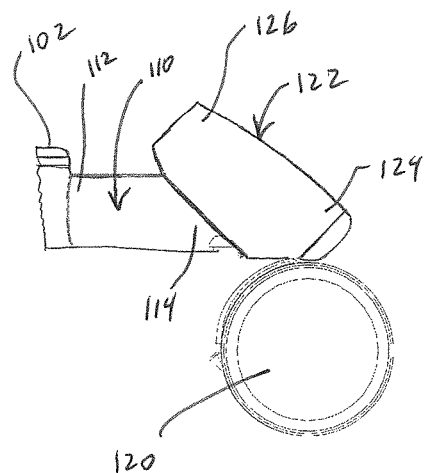
FIG. 7C is a detail view, as in FIG. 7B, showing a wheel lock lever in a second position.
Figure 7D:
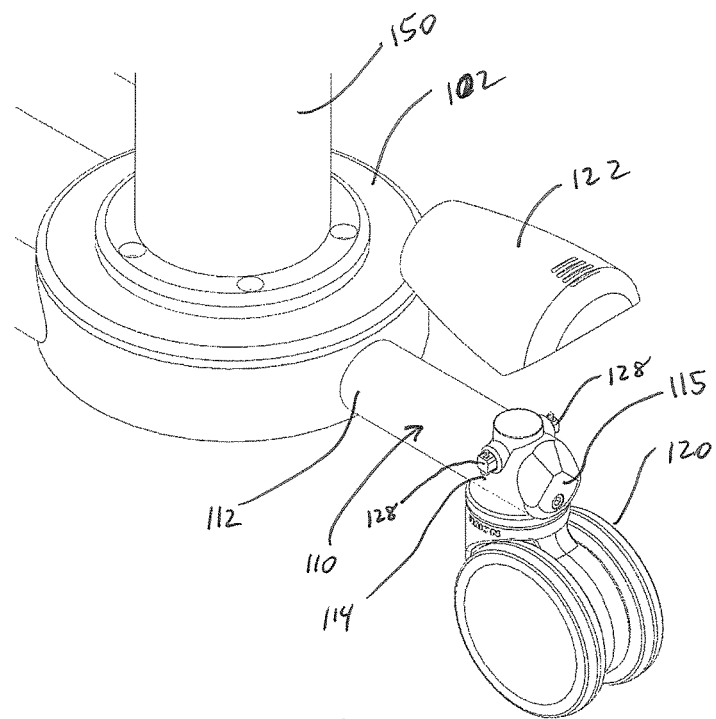
FIG. 7D is an exploded perspective view of a portion of an exemplary embodiment of an imaging stand assembly system, as in FIG. 6A, showing a wheel lock lever removed from a base member.

In some embodiments, such as is shown in FIG. 6A, at least one support arm 110 extends from the hub member 102 in a forward direction, approximately underneath the forward portion 204 of the boom arm 200, prior to extending in an outboard direction. In this way, the distal end 114 is displaced from the hub member 102 in a direction that is both forward and outboard of the hub member 102, so as to provide a more stable support location, without requiring a user to straddle the support arm 110 while standing alongside the imaging stand 10. For instance, a user may wish to utilize a forward handle 242 coupled to the forward portion 204 of the boom arm 200 to assist in moving the imaging platform 300 to a particular location. In such a situation, it may be difficult or impossible for the user to move the imaging platform 300 if the user is unable to stand directly next to the boom arm 200. If the user is required to straddle a support arm 110, movement of the imaging platform 300 may be more difficult and/or the user may be more likely to trip on the support arm 110.

In some embodiments, not shown, the base member 100 includes one or more features known by those skilled in the art to allow a user to adjust the base member 100 to ensure the imaging stand 10 is horizontally level. For example, in some embodiments the imaging stand 10 includes self-leveling outriggers. Various embodiments of the present invention also include alignment features at the interface between the base member 100 and the vertical support member 150 and at the interface between the vertical support member 150 and the boom arm 200. In this way, the orientation of the boom arm 200 is fixed relative to the orientation of the base member 100.

In some embodiments, the hub member 102 of the base member 100 includes at least one alignment pin 104 and the bottom end 152 of the vertical support member 150 defines at least one alignment hole that is configured to receive the at least one alignment pin 104 when the bottom end 152 of the vertical support member 150 is coupled to the hub member 102. In other such embodiments, the bottom end 152 of the vertical support member 150 includes at least one alignment pin (not shown) and the hub member 102 of the base member 100 defines at least one alignment hole (not shown) that is configured to receive the at least one alignment pin when the bottom end 152 of the vertical support member 150 is coupled to the hub member 102.

In some embodiments, the imaging stand 10 includes a yolk 160 removably coupled to the top end 154 of the vertical support member 150. In some such embodiments, the yolk 160 is configured to align the boom arm 200 in a forward-aft direction relative to the base member 100. In some embodiments, the yolk 160 is positioned on one side of the boom arm 200. In other embodiments, the yolk 160 is coupled to each side of the boom arm 200. In still other embodiments, a single yolk 160 defines a throat 162 that is configured to receive the boom arm 200 so that the yolk 160 may be coupled to both sides of the boom arm 200. In other embodiments, the yolk 160 is integral to the vertical support member 150.

In some embodiments of the present invention, the top end 154 of the vertical support member 150 defines a recess 158 that is configured to receive a bottom end 164 of a yolk 160. In some embodiments, as shown in FIGS. 8A, 8B, and 8C, the recess 158 is defined by a bushing 156 that is received by the top end 154 of the vertical support 150. In some such embodiments, the recess 158 is tapered. In other such embodiments, the bushing 156 defines at least one alignment slot 155 for receiving an alignment pin 165 of the yolk 160. In some embodiments, the alignment slot 155 includes a primarily vertical portion with a primarily horizontal portion at or near the bottom of the primarily vertical position. In this way, the alignment slot 155 enables the bottom end 164 of the yolk 160 to be lowered into the recess 158 prior to being rotated into position.

In some embodiments of the present invention, the boom arm 200 is manufactured, at least in part, from a four-bar linkage system. In some such embodiments, the upper boom arm 210, the lower boom arm 220, the aft end linkage component 230, and the forward end linkage component 240 comprise the four bars in the four-bar linkage system. In other embodiments, the upper boom arm 210, the lower boom arm 220, the forward end linkage component 240, and the vertical support member 150 and/or the yolk 160 comprise the four bars in a four-bar linkage system. In still other embodiments, other components comprise the four bars in the four-bar linkage system.

In some embodiments, at least one brake plate 252 is coupled to each of the upper 210 and lower 220 boom arms. In some embodiments, multiple upper brake plates 252a, 252c are coupled to the upper boom arm 210 and multiple lower brake plates 252b, 252d are coupled to the lower boom arm 220. Each brake plate 252 is positioned so that the upper boom arm 210 and the lower boom arm 220 are free to move relative to each other when the locking pin 256 is in the unlocked configuration. At least one upper brake plate 252a is positioned so that it is pressed against at least one lower brake plate 252b when the locking pin 256 is in the locked configuration. In this way, the upper boom arm 210 and the lower boom arm 220 are prevented from moving relative to each other so as to hold the imaging platform 300 at a desired height.

In some embodiments, each brake plate 252 defines a slot 254. Each slot 254 is configured so that the locking pin 256 may be received by all slots 254 as the upper boom arm 210 is moved relative to the lower boom arm 220. In this way, the locking pin 256 is received by all slots 254 as the imaging platform 300 travels between the raised position and the lowered position.

In use, the imaging stand 10 is moved along a horizontal support plane into position relative to an object. The wheel lock levers 122 are then moved from their first positions to their second positions, thereby moving the wheels 120 from their unlocked configurations to their locked configurations. In some embodiments, additional features, such as self-leveling outriggers, are used to provide additional stability and positioning adjustment of the imaging stand 10 relative to the horizontal support plane and the object.

Upon positioning the imaging stand 10 relative to the object, an imaging device, such as a scanner, is coupled to the imaging platform 300. In some embodiments, an end pivot 302 is used to orient the scanner relative to the object and/or the horizontal support plane.

Next, a user moves the braking mechanism 250 from the locked configuration to the unlocked configuration by moving the locking pin 256 from the tightened configuration to the loosened configuration. The user then moves the imaging platform 300 to a desired height prior to returning the braking mechanism 250 to the locked configuration, by returning the locking pin 256 to the tightened configuration, so as to retain the imaging platform 300 at the desired height. In some embodiments, one or more handles 232, 242 and/or a spring mechanism 260 are used to assist the user in moving the imaging platform 300 to the desired height. In other embodiments, a locking lever 258 is used to assist the user in moving the locking pin 256 between the tightened and loosened configurations.

Finally, a user utilizes the imaging device at the current position prior to moving the imaging device to another position. In some embodiments, the imaging device is capable of being moved without requiring the user to change the height of the imaging platform 300. In other embodiments, the imaging stand 10 includes features that enable the user to duplicate the height of the imaging platform 300.

Throughout the image capturing process, in some embodiments, a user is able to quickly and easily determine the configuration of various components simply by glancing at various other components. For instance, in some embodiments, a user is able to determine whether wheels 120 are in the locked configuration or the unlocked configuration simply by glancing at a wheel lock lever 122. Furthermore, in some embodiments, a user is able to move a wheel 120 between the locked and unlocked configurations simply by stepping on a first 124 or second 126 portion of the wheel lock lever 122. As another example, in some embodiments, a user is able to determine whether the braking mechanism 250 is in the locked configuration or the unlocked configuration simply by observing the orientation of one or more locking lever 258.

Thus, while the present general inventive concept has been shown in the drawings and fully described above with particularity and detail in connection with what is presently deemed to be the most practical and preferred embodiment (s) of the invention, it will be apparent to those of ordinary skill in the art that many modifications thereof may be made without departing from the principles and concepts set forth herein, including, but not limited to, variations in size, materials, shape, form, function and manner of operation, assembly and use; applications in contexts outside metrology; and operations in a form other than an imaging stand system.

It is also to be understood that the claims to follow are or will be intended to cover all of the generic and specific features of the invention herein described, and all statements of the scope of the invention which, as a matter of language, might be said to fall therebetween. Hence, the proper scope of the present general inventive concept should be determined only by the broadest interpretation of such claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

We claim:

1. An imaging stand comprising:
   a base member configured to be supported by a horizontal support plane;
   a vertical support member extending vertically from said base member;
   a boom arm coupled to said vertical support member and displaced from said base member;
   an imaging platform coupled to said boom arm, said imaging platform being movable between a raised position and a lowered position;
   a braking mechanism coupled to said boom arm and movable between a locked configuration and an unlocked configuration, wherein said braking mechanism is configured to secure said imaging platform in a vertical position when said braking mechanism is in said locked configuration;
   a locking pin operatively coupled to said braking mechanism and movable between a tightened configuration and a loosened configuration; and
   a spring mechanism coupled to the boom arm and configured to counteract gravitational forces as the imaging platform is being moved between the raised position and the lowered position,
   wherein said imaging platform is configured to support an imaging device in a first angular orientation relative to the horizontal support plane when said imaging platform is in the lowered position, and wherein said boom arm and said imaging platform, together, are configured such that said imaging platform supports the imaging device in the first angular orientation relative to the horizontal support plane when said imaging platform is in the raised position wherein said locking pin is moved between the tightened configuration and the loosened configuration by rotating the locking pin a partial revolution wherein said boom arm and said imaging platform, together, are configured such that the imaging platform maintains the imaging device in the first angular orientation relative to the horizontal support plane while said imaging platform is being moved through a plurality of intermediate vertical positions located between the raised and lowered positions, wherein said locking pin is configured to move said braking mechanism to said locked configuration when said locking pin is moved to said tightened configuration, wherein said locking pin is configured to allow said braking mechanism to move to said unlocked configuration when said locking pin is in the loosened configuration, wherein said locking pin extends through said boom arm, wherein a locking lever extends from each end of said locking pin so as to provide a user with a mechanical advantage for moving said locking pin between the tightened and loosened configurations from either side of the boom arm, wherein said locking pin is configured such that moving either locking lever causes the other locking lever to move in unison, and wherein said braking mechanism includes at least one stop pin so as to prevent said locking pin from moving beyond the tightened and loosened configurations.

2. The imaging stand of claim 1 wherein the imaging device is horizontal and level when said imaging platform supports the imaging device in the first angular orientation relative to the horizontal support plane.

3. An imaging stand comprising:
a base member configured to be supported by a horizontal support plane;
a vertical support member extending vertically from said base member;
a boom arm coupled to said vertical support member and displaced from said base member;
an imaging platform coupled to said boom arm, said imaging platform being movable between a raised position and a lowered position;
a braking mechanism coupled to said boom arm and movable between a locked configuration and an unlocked configuration, wherein said braking mechanism is configured to secure said imaging platform in a vertical position when said braking mechanism is in said locked configuration; and
a locking pin operatively coupled to said braking mechanism and movable between a tightened configuration and a loosened configuration; and
a spring mechanism coupled to the boom arm and configured to counteract gravitational forces as the imaging platform is being moved between a raised position and a lowered position,
wherein said imaging platform is configured to support an imaging device in a first angular orientation relative to the horizontal support plane when said imaging platform is in the lowered position, and wherein said boom arm and said imaging platform, together, are configured such that said imaging platform supports the imaging device in the first angular orientation relative to the horizontal support plane when said imaging platform is in the raised position wherein said locking pin is moved between the tightened configuration and the loosened configuration by rotating the locking pin a partial revolution, wherein said boom arm and said imaging platform, together, are configured such that the imaging platform maintains the imaging device in the first angular orientation relative to the horizontal support plane while said imaging platform is being moved through a plurality of intermediate vertical positions located between the raised and lowered positions, and wherein said braking mechanism comprises an upper brake plate coupled to an upper boom arm of said boom arm and a lower brake plate coupled to a lower boom arm of said boom arm, wherein said upper and lower brake plates are pressed together when said locking pin is in the tightened configuration so as to cause said upper and lower braking plates to be in direct contact with each other, thereby preventing said upper boom arm from moving relative to said lower boom arm.

4. The imaging stand of claim 3, wherein said locking pin is configured to press said brake plates together when said locking pin is in the tightened configuration.

5. An imaging stand comprising:
a base member configured to be supported by a horizontal support plane;
a vertical support member extending vertically from said base member;
a boom arm coupled to said vertical support member and displaced from said base member;
an imaging platform coupled to said boom arm, said imaging platform being movable between a raised position and a lowered position;
a plurality of support arms extending from a hub member of said base member;
a plurality of wheels so as to enable moving the imaging stand along the horizontal support plane, a first wheel of said plurality of wheels being coupled to at least one of said plurality of support arms at or near said distal end of said support arm; and
a wheel lock lever operatively coupled to said lockable wheel, said wheel lock lever having a cover portion and being movable between a first position and a second position,
wherein said boom arm includes a forward portion extending forward of the vertical support member,
wherein said boom arm includes a forward end linkage component coupled to said forward portion,
wherein said imaging platform is coupled to said forward end linkage component of said boom arm,
wherein each support arm of said plurality of support arms includes a proximal end coupled to the hub member and a distal end displaced from the hub member;
wherein a first support arm of said plurality of support arms includes a first portion extending in the forward direction from the hub member and a second portion extending outboard from the first portion such that said first support arm defines a clear area between said proximal and distal ends of said first support arm so as to allow a user to stand between said proximal and distal ends of said first support arm without straddling said first support arm, wherein said first wheel is a lockable wheel, said lockable wheel being movable between an unlocked configuration and a locked configuration, wherein the imaging stand is prevented from moving along the horizontal support plane when said lockable wheel is in the locked configuration, wherein said cover portion having a configuration that corresponds with a configuration of said support arm so as to give the appearance that said cover portion is part of said support arm when said wheel lock is in the unlocked configuration, wherein moving said wheel lock lever from the first position to the second position moves the lockable wheel from the unlocked configuration to the locked configuration and repositions said cover portion such that it is obvious that said cover portion is not part of said support arm, thereby providing a visual indication that the lockable wheel is in the locked configuration, and wherein moving said wheel lock lever from the second position to the first position moves the lockable wheel from the locked configuration to the unlocked configuration.

6. The imaging stand of claim 5 further comprising a forward handle coupled to said forward portion of said boom arm, said forward handle being positioned so that a user can utilize the forward handle to move said boom arm while the user is positioned in the clear area defined by said first support arm.

7. The imaging stand of claim 5 wherein said cover portion of said wheel lock lever includes a first portion and a second portion, wherein:

said wheel lock lever is configured to move from the first position to the second position when a downward force is applied to said first portion of said cover portion; and said wheel lock lever is configured to move from the second position to the first position when a downward force is applied to said second portion of said cover portion.

8. An imaging stand comprising:

a base member configured to be supported by a horizontal support plane;

a vertical support member having a bottom end coupled to said base member and a top end vertically displaced from said base member;

a bushing coupled to said top end of said vertical support member;

a yolk selectively coupled to said bushing;

a boom arm coupled to said yolk; and an imaging platform coupled to said boom arm, said imaging platform being movable between a raised position and a lowered position;

wherein said bushing defines a tapered recess that is configured to selectively receive a bottom end of said yolk while said bushing is coupled to said top end of said vertical support member, thereby allowing said boom arm to be selectively coupled to said vertical support member by allowing said yolk to be selectively coupled to said bushing.

9. The imaging stand of claim 8 wherein said bottom end of said yolk includes at least one alignment pin and said bushing defines at least one slot, said slot of said bushing being configured to receive said at least one alignment pin of said bottom end of said yolk as said bottom end of said yolk is selectively received by said bushing.

10. The imaging stand of claim 8 further comprising a spring mechanism coupled to the boom arm and configured to counteract gravitational forces as the imaging platform is being moved between a raised position and a lowered position.

* * * * *